United States Patent
Emery et al.

(10) Patent No.: US 11,173,989 B2
(45) Date of Patent: Nov. 16, 2021

(54) FLOATING SUPPORT STRUCTURE COMPRISING A FLOATER AND A DAMPING PLATE WITH A ROW OF APERTURES

(71) Applicant: IFP Energies nouvelles, Rueil-Malmaison (FR)

(72) Inventors: Adrien Emery, Rueil Malmaison (FR); Pauline Bozonnet, Lyons (FR); Yann Poirette, Reventin-Vaugris (FR); Timothee Perdrizet, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 472 days.

(21) Appl. No.: 16/319,505

(22) PCT Filed: Jul. 4, 2017

(86) PCT No.: PCT/EP2017/066668
§ 371 (c)(1),
(2) Date: Jan. 22, 2019

(87) PCT Pub. No.: WO2018/019526
PCT Pub. Date: Feb. 1, 2018

(65) Prior Publication Data
US 2021/0284294 A1    Sep. 16, 2021

(30) Foreign Application Priority Data
Jul. 26, 2016  (FR) .................... 16/57.172

(51) Int. Cl.
*B63B 35/44* (2006.01)
*B63B 5/18* (2006.01)
*B63B 39/06* (2006.01)

(52) U.S. Cl.
CPC ............. *B63B 35/44* (2013.01); *B63B 5/18* (2013.01); *B63B 39/06* (2013.01); *B63B 2035/446* (2013.01); *B63B 2039/067* (2013.01)

(58) Field of Classification Search
CPC .......... B63B 35/00; B63B 35/44; B63B 5/00; B63B 5/18; B63B 39/00; B63B 39/02;
(Continued)

(56) References Cited

U.S. PATENT DOCUMENTS 7,037,044 B2 * 5/2006 Xu ..................... B63B 35/4413
114/264
7,900,572 B2 * 3/2011 Leverette ............ B63B 35/4413
114/122

(Continued)

FOREIGN PATENT DOCUMENTS

| CN | 1857961    | 11/2006 |
| CN | 201347195 Y | 11/2009 |

(Continued)

OTHER PUBLICATIONS

International Search Report for PCT/EP2017/066668, dated Aug. 29, 2017; English translation submitted herewith (7 pgs.).
(Continued)

*Primary Examiner* — Lars A Olson
(74) *Attorney, Agent, or Firm* — Fitch, Even, Tabin & Flannery LLP

(57) ABSTRACT

The present invention is a floating support structure (1) provided with a main floater (2) and a heave plate (3). The heave plate (3) comprises a single row of orifices (4), substantially parallel to the periphery of the heave plate.

25 Claims, 2 Drawing Sheets

(58) Field of Classification Search
CPC .............. B63B 39/06; B63B 2035/446; B63B 2039/067
USPC .................................................. 114/121, 122
See application file for complete search history.

(56) References Cited

U.S. PATENT DOCUMENTS

| | | | |
|---|---|---|---|
| 8,291,849 B2* | 10/2012 | Leverette | B63B 35/4413 114/122 |
| 8,418,640 B2* | 4/2013 | Leverette | B63B 35/4413 114/122 |
| 10,569,844 B2* | 2/2020 | Gilloteaux | B63B 35/44 |
| 10,774,813 B2* | 9/2020 | Gomez | B63B 35/44 |
| 2016/0101833 A1 | 4/2016 | Gilloteaux et al. | |

FOREIGN PATENT DOCUMENTS

| | | |
|---|---|---|
| CN | 204415681 U | 6/2015 |
| CN | 104943827 | 9/2015 |
| FR | 3005698 A1 | 11/2014 |
| JP | 2008-062677 A | 3/2008 |
| WO | 2009/131826 A2 | 10/2009 |
| WO | 2014/184454 A1 | 11/2014 |

OTHER PUBLICATIONS

Thiagarajan, K., et al., "Influence of Heave Plate Geometry on the Heave Response of Classic Spars", Proceedings of OMAE '02, 21st International Conference on Offshore Mechanics and Artic Engineering, Jun. 23-28, 2002, Oslo, Norway, 7 pages.
Wu, W., et al., "Research on Hydrodynamic Characteristics of Forced Oscilliation of Heave Plate of Spar Platform", Ship Mechanics, Feb. 2009, 8 pages.
Liu, J., "Hydrodynamic Analysis and Design of Heave Damping Plates", China Excellent Master's Paper Database—Basic Science, pp. 6-10, Oct. 2014, 7 pages.
CN Application No. 201780046380.4, First Office Action dated Jun. 19, 2020, 40 pages.
CN Application No. 201780046380.4, Second Office Action dated Dec. 17, 2020, 30 pages.

* cited by examiner

FLOATING SUPPORT STRUCTURE COMPRISING A FLOATER AND A DAMPING PLATE WITH A ROW OF APERTURES

CROSS REFERENCE TO RELATED APPLICATIONS

Reference is made to PCT/EP2017/066668 filed Jul. 4, 2017, and French Application No. 16/57.172 filed Jul. 26, 2016, which are incorporated herein by reference in their entirety.

BACKGROUND OF THE INVENTION

Field of the Invention

The present invention relates to offshore floating support structures, in particular for offshore wind turbines.

Description of the Prior Art

The floating support structure of an offshore wind turbine supports, in the emerged part, the wind turbine made up of the blades, the rotor, the nacelle and the tower fastened onto the floating support. These floating support structures can be anchored to the seabed by taut, semi-taut or catenary anchor lines. The goal of the floating support is to provide wind turbine buoyancy and stability to take up the stresses exerted thereon while limiting motion of the assembly.

Various floating support structures intended for installing offshore multi-megawatt wind turbines are currently under development in many countries. Depending on the depth of the site being considered, several design options are possible. Despite their great diversity, several floating support structure families emerge, among which:

- SPAR (Single Point Anchor Reservoir) floaters, which are characterized by a slender geometric shape and comprising significant ballast to lower the center of gravity of the whole structure to the maximum and thus to provide stability (referred to as mass stability);
- Barge type floaters are very wide shallow drafted support structures. Their stability is provided by their wide waterplane area (referred to as form stability). However, this type of support structure is very sensitive to wave motion;
- TLP (Tension Leg Platform) support structures that have the specific feature of being moored to the seabed by taut cables providing structure stability;
- Semi-submersible type floaters are support structures having at least three floaters connected by arms providing stiffness. These support structures generally have a low displacement and a great waterplane area inertia, thus providing sufficient righting moment for the stability thereof. Furthermore, this type of floater is less sensitive to wave motion than barges.

For all the floating support families, the main design criteria are stability, counter-balancing of the thrust caused by the wind force and limitation of the floating support motion.

In order to ensure stability and low motion of the floating support, one solution uses a heave plate, also referred to as damper plate or skirt, at the floater of the floating support structure. The heave plate projects from the floater so as to damp notably heave, as well as roll and pitch motions of the floating support.

French patent application 3,005,698 (WO-2014/184,454) describes such an example of a floating support provided with a heave plate within the context of a floating support structure for an offshore wind turbine. However, damping is not optimal with the configurations provided in this patent application.

SUMMARY OF THE INVENTION

To overcome these drawbacks, the present invention relates to a floating support structure provided with a main floater and with a heave plate. The heave plate comprises a single row of orifices which are substantially parallel to the periphery of the heave plate. This row of orifices provides increased damping of the floating support structure.

The present invention is a floating support structure comprising at least one main floater and at least one heave plate. The surface area of the horizontal section of the heave plate is greater than surface area of the horizontal section of the main floater. The heave plate is fastened to the main floater, and the heave plate comprises a plurality of orifices. The orifices are evenly distributed to form a single row of orifices which are parallel to the outer periphery of the heave plate.

According to an embodiment, the orifices are substantially circular, trapezoidal or rectangular.

According to an implementation, the porosity of the heave plate in the region of the row of orifices ranges between 0.1 and 10%.

According to an aspect of the invention, the heave plate comprises a plurality of at least one of notches and projections evenly distributed over the outer periphery thereof.

Preferably, the notches and the projections are substantially rectangular.

Advantageously, the heave plate is fastened to the base of the main floater.

According to a feature, the heave plate comprises at least one stiffener, which is positioned from the center to the outer periphery of the heave plate.

Advantageously, the horizontal section of the heave plate varies with depth.

According to an embodiment of the invention, the heave plate is steel or concrete.

According to a feature, the heave plate comprises a substantially circular, hexagonal or square horizontal section.

Furthermore, the invention relates to an offshore wind turbine comprising a wind turbine and a floating support structure according to one of the aforementioned features.

BRIEF DESCRIPTION OF THE DRAWINGS

Other features and advantages of the device according to the invention will be clear from reading the description hereafter of embodiments given by way of non-limitative example, with reference to the accompanying figures wherein.

DETAILED DESCRIPTION OF THE INVENTION

Figure 1:
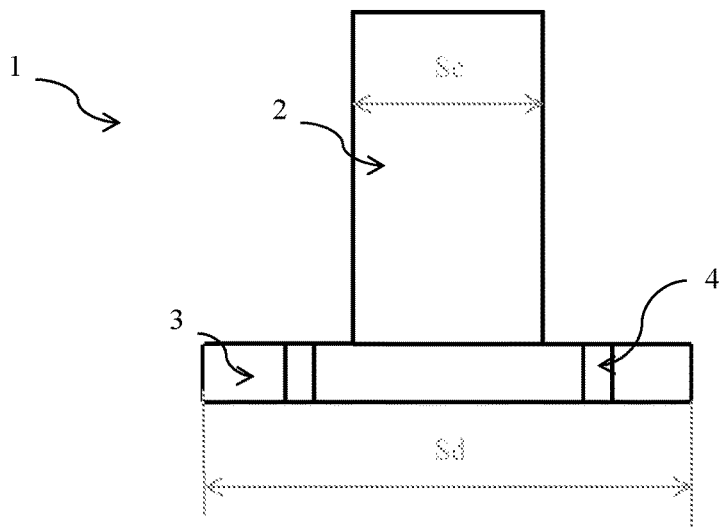
FIG. 1 illustrates a floating support structure according to a first embodiment of the invention.

The present invention relates to a floating support structure. The floating support structure can be used as a foundation for an offshore wind turbine, but it can also be used in other fields such as offshore oil recovery and ocean energy recovery (thermal energy, wave energy, current energy, etc.).

The floating support structure according to the invention can belong to the family of SPAR type, barge type, TLP type or semi-submersible type (of tri-floater type for example) floaters.

The floating support structure comprises at least one main floater and at least one heave plate. The main floater provides floating support buoyancy. The floating support structure can comprise one or more main floaters connected to one another. The main floater can have, by way of non limitative example, a substantially elongate shape with the height (along the vertical axis under normal conditions of use of the floating support) can be at least equal to or greater than the other horizontal dimensions of the main floater. The main floater can have any shape, notably a parallelepipedic, cylindrical, prismatic, conical, truncated cone, etc., shape. The surface area of the horizontal section of the main floater is denoted by Sc. The horizontal section is understood to be the section of the main floater (or of the heave plate) cut by a horizontal plane, when the floating support is in a "normal" position of use, notably without wind thrust. For one embodiment the main floater has a cylindrical shape and the horizontal section is circular. The main floater can be steel or concrete. In order to provide buoyancy, the main floater can have an inner volume filled with air.

According to the invention, the heave plate is fastened to the main floater. The heave plate is thin which has a small thickness (height along the vertical axis when the floating support structure is in "normal" position of use) in relation to the other dimensions of the plate, depending on the position of use of the floating support. According to the invention, the heave plate comprises a plurality of orifices. The orifices are substantially vertical when the floating support structure is in "normal" position of use, for example without wind thrust. Alternatively, the orifices can be substantially inclined with respect to the vertical direction. The orifices are evenly distributed on the heave plate to form a single row of orifices. This single row of orifices is substantially parallel to the outer periphery of the heave plate. In other words, the row has a shape substantially identical to that of the plate. For example, if the heave plate is circular, the row of orifices is circular, or if the heave plate is hexagonal, the row of orifices is hexagonal, etc. The orifices allow passage of liquid (sea water) through the heave plate. Furthermore, the presence of orifices limits the decrease in the added water mass term specific to annular porous skirts, while keeping a substantial damping gain. Furthermore, the heave plates according to the invention are simpler to make than a porous skirt with a large number of orifices over the total surface.

The heave plate can be concrete or metal which notably is steel. The heave plate can comprise reinforcements linking the main floater to the heave plate. These reinforcements, also referred to as stiffeners, can be used notably when the heave plate is made of metal. These reinforcements can be perpendicular to the heave plate. Furthermore, the reinforcements can have a thickness varying with depth. The reinforcements allow the resistance of the heave plate to be increased.

The various embodiments described below can be combined so as to combine their effects.

According to one embodiment of the invention, the orifices can be holes running through the heave plate. The holes can be made by boring or by any other similar processes.

According to an alternative, the orifices can be delimited by two annular parts and by stiffeners (reinforcements). For example, a spacing can be provided between the periphery of the main floater and the inner contour of the heave plate with this spacing being divided into orifices by stiffeners linking the main floater to the heave plate. In this case, the heave plate is referred to as annular. The stiffeners can be oriented from the center of the main floater to the periphery of the heave plate. The stiffeners can be metal plates. The stiffeners can be perpendicular to the heave plate.

The orifices can have different shapes such as being circular, rectangular, triangular, hexagonal, etc. Preferably, the orifices can be substantially circular when they are holes running through the heave plate, and the orifices can be substantially trapezoidal when they are delimited by an annular heave plate and stiffeners. The radii of the circular orifices can range between 0.1 and 2 m. The dimensions of these trapezia can range between 0.1 and 2 m.

According to an embodiment of the invention, all the orifices have identical shape and dimensions.

According to an embodiment of the invention, the heave plate can be fastened to the base of the main floater. This construction enables simple design of the floating support structure while providing good damping of the floating support and especially good stability of the support structure.

Alternatively, the heave plate can be fastened to any point of the main floater.

According to an implementation option, the floating support structure comprises a single heave plate. This construction allows the design of the floating support to be facilitated.

Alternatively, the floating support structure can comprise a plurality of heave plates fastened at different heights of the main floater to optimize damping of the floating support.

According to an embodiment of the invention, the heave plate and the floater are centered with respect to each other.

According to an embodiment, the heave plate has a horizontal section whose shape is identical to the horizontal section of the main floater, with greater dimensions. In other words, the horizontal section of the heave plate can be a homothety of the horizontal section of the main floater. For example, if the main floater is cylindrical, the horizontal section of the heave plate can be circular. According to another example, if the main floater is parallelepipedic, the horizontal section of the heave plate can be rectangular. According to a third example, if the main floater has a hexagonal section, the horizontal section of the heave plate can be hexagonal.

According to an alternative, the shape of the heave plate can be different from the shape of the main floater. For example, the main floater can have a substantially cylindrical shape and the heave plate can have a polygonal shape, hexagonal for example, and vice versa.

Furthermore, if the floating support structure is of multi-floater type, a tri-floater for example, a heave plate can be provided at the base of each floater, of three floaters for example.

The row of orifices can be provided at any point of the span of the heave plate. The span of the heave plate is understood to be the minimum distance between the peripheral end of the main floater and the peripheral end of the heave plate. For example, if the main floater and the heave plate are cylindrical, the span corresponds to the radius difference between the main floater and the heave plate. According to another example, if the main floater and the heave plate have a square section, the span corresponds to half the side difference between the main floater and the heave plate. According to a first example, the distance of the row of orifices from the outer periphery of the heave plate can be close to 100% of the span of the heave plate. According to a second example, the distance of the row of orifices from the outer periphery of the heave plate can be close to 50% of the span of the heave plate. According to a third example, the distance of the row of orifices from the outer periphery of the heave plate can be close to 10% of the span of the heave plate.

Thus, a distance representing 100% of the span from the outer periphery of the heave plate corresponds to an arrangement of the orifices around the main floater, so that the orifices are far away from the outer periphery of the heave plate. With this arrangement, close to 100%, substantially ranging between 70% and 100% for example, can be suitable for orifices made up of an annular heave plate and stiffeners.

According to an implementation example of the invention, when the orifices are holes running through the heave plate, the orifices can be arranged substantially at the center of the heave plate at a distance from the outer periphery representing substantially 40% to 60% of the span of the heave plate.

A distance representing substantially 10%, that is between 1 and 30%, from the outer periphery of the heave plate span corresponds to an arrangement of the orifices on the periphery of the heave plate. This design allows better resistance of the heave plate to be achieved.

According to an embodiment of the invention, the porosity of the heave plate ranges between 0.1 and 10% for optimizing damping of the floating support structure. The porosity corresponds to the ratio of the surface area allowing passage of the liquid to the total surface area. The porosity can be selected according to the dimensions of the main floater and of the heave plate.

According to an embodiment, the heave plate can have a horizontal section varying with depth, which increases stability and damping of the heave plate. Thus, the heave plate comprises a variation in the thickness thereof with depth.

Furthermore, the heave plate horizontal section having a minimum surface area, denoted by this surface area is greater than surface area Sc of the horizontal section of the main floater. Thus, the periphery of the heave plate may be variable in thickness and the periphery of the heave plate can have a thinner outer peripheral end, having reduced thickness relative to a thickness of a remainder of the heave plate. This thickness variation in a minimum surface area provides a structurally resistant heave plate, and has a thinner outer peripheral end which favors hydrodynamic damping.

According to an aspect of the invention, the heave plate can have a horizontal section increasing with depth. Thus, in the position of use of the floating support structure, the heave plate has a greater section at the base thereof and a smaller section at the top thereof. The heave plate is reduced in thickness such that it is thinner with depth (decreasing thickness). This increase in the horizontal section of the heave plate allows a hydrodynamic shape to be generated, which favors heave, roll and pitch damping. This construction affords the advantage of easy implementation.

In a variant, the heave plate can have a horizontal section decreasing with depth. Thus, in the position of use of the floating support structure, the heave plate has a greater section at the top thereof and a smaller base. The heave plate thus is thinner at the top thereof (decreasing thickness). This decrease in the horizontal section of the heave plate allows a hydrodynamic shape to be generated, which favors heave, roll and pitch damping.

Alternatively, the shape of the heave plate can have two truncated cone-shaped volumes whose sections of greater surface area are juxtaposed at the center thereof. The two truncated volumes preferably have identical dimensions. Thus, the horizontal section of the heave plate increases with depth over a first height (corresponding to the upper part of the heave plate), then it decreases with depth over a second height (corresponding to the lower part of the heave plate). Thus, the heave plate has a greater section at the center thereof and smaller sections at the base and the top thereof. This heave plate design allows a hydrodynamic shape to be generated, which favors heave, roll and pitch damping.

According to an embodiment of the invention, in order to ensure good resistance of the floating support structure, the span of the heave plate can range between 1 and 15 m and preferably is between 3 and 10 m. Such a span guarantees minimum dimensions for the heave plate in relation to the dimensions of the main floater, which allows the resistance thereof to be increased. For structural reasons, the skirt span is limited to 12 m, or even 10 m if the radius of the main cylinder itself is great (typically 12 m).

According to a non limitative implementation example, at the root end of the heave plate, a thickness of the heave plate, or possibly of the reinforcements, can be greater than or equal to 1.5 m. In other words, according to this example, the thickness of the heave plate at the periphery of the main floater can be greater than or equal to 1.5 m. This thickness of the heave plate root end guarantees optimized resistance of the heave plate.

According to an implementation option of the invention, the heave plate can comprise at least one of a plurality of notches and projections which are evenly distributed over the periphery thereof. It is thus possible to increase the circumference of the heave plate, which has the effect of increasing the area where vortex shedding occurs, without however increasing the surface area of the heave plate. The notches and the projections can have any shape, such as notably rectangular, semi-circular, sinusoidal, etc. The notches can be provided notably by machining of the heave plate.

According to a design, the floating support structure can comprise permanent ballast. This permanent ballast can be arranged at the base of the main floater, for example above the heave plate. The permanent ballast allows hydrostatic equilibrium of the floating support structure. It can be concrete, sea water or any heavy solid or liquid matter. The masses of these various materials can be distributed to meet both static and dynamic stability criteria, and also to decrease the manufacturing cost of the floating support structure.

According to a feature, the floating support structure can comprise at least one and preferably more dynamic ballast caissons whose volume can be ballasted or deballasted depending on the conditions of use of the floating support structure. The ballast used in these caissons can notably be sea water. These dynamic ballast caissons can be included in the main floater, for example above the heave plate, and possibly above the permanent ballast. The dynamic ballast caissons allow correction and adjustment of the trim angle of the floating support structure, and therefore the axis of the system arranged on the floating support structure. The dynamic ballast caissons can be provided within the main floater, in the peripheral part thereof.

FIG. 1 schematically illustrates, by way of non limitative example, a floating support structure according to a first embodiment of the invention. FIG. 1 is a sectional view of a floating support structure 1. Floating support structure 1 comprises a substantially cylindrical main floater 2 of horizontal sectional surface area Sc. Floating support structure 1 also comprises a heave plate 3 fastened to the base of main floater 2. Heave plate 3 has a substantially cylindrical shape. The surface area of the horizontal section of heave plate 3 is greater than the surface area of the horizontal section of the main floater. Heave plate 3 comprises a plurality of orifices 4. The row of orifices 4 is also circular. Orifices 4 are substantially circular. Orifices 4 are holes provided substantially at a distance from the outer periphery of heave plate 3 corresponding to two thirds of the heave plate span.

Figure 2:
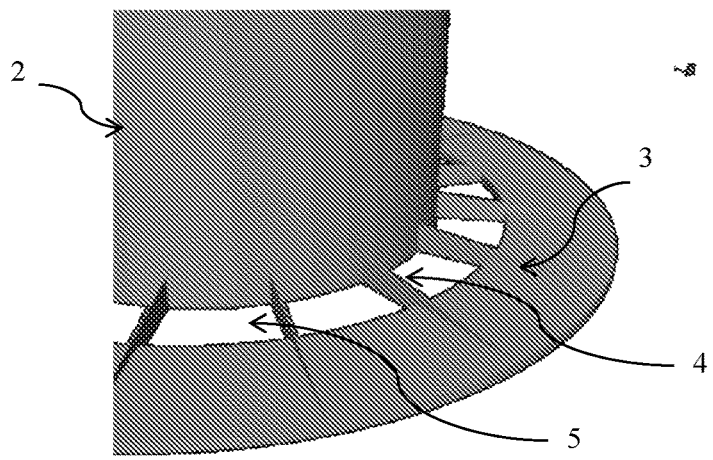
FIG. 2 illustrates a floating support structure according to a second embodiment of the invention.

FIG. 2 schematically illustrates, by way of non limitative example, a floating support structure according to a second embodiment of the invention. FIG. 2 is a three-dimensional partial view of the floating support structure. The floating support structure comprises a substantially cylindrical main floater 2. The floating support structure also comprises a heave plate 3 fastened to the base of main floater 2. Heave plate 3 is cylindrical. Furthermore, heave plate 3 is annular and has an annular space between main floater 2 and heave plate 3. Stiffeners 5 are provided for linking main floater 2 and heave plate 3. Stiffeners 5 are radial in relation to main floater 2 and heave plate 3. Orifices 4 are formed in this space which are limited by main floater 2, heave plate 3 and have consecutive stiffeners 5. Thus, the orifices have a substantially trapezoidal shape. The row of orifices 4 thus is circular. Furthermore, the distance between orifices 4 and the outer periphery of heave plate 3 is close to 100% of the heave plate span.

Figures 3A, 3B:
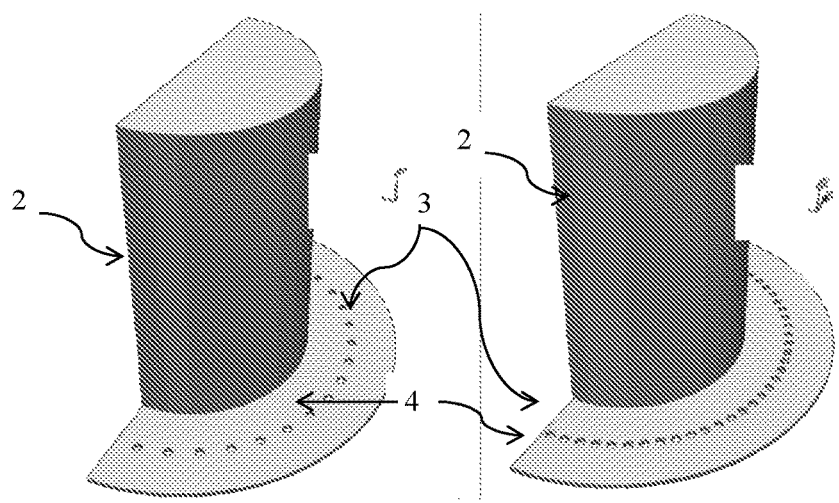
FIGS. 3a and 3b illustrate two variant embodiments of the floating support structure according to the first embodiment of the invention.

FIGS. 3a and 3b schematically illustrate, by way of non limitative example, two variant embodiments of the first embodiment shown in FIG. 1. FIGS. 3a and 3b are three-dimensional views showing half a floating support structure. For both figures, the floating support structure comprises a substantially cylindrical main floater 2. The floating support also comprises a heave plate 3 fastened to the base of main floater 2. Heave plate 3 is substantially cylindrical. The surface area of the horizontal section of heave plate 3 is greater than the surface area of the horizontal section of the main floater. Heave plate 3 comprises a row of orifices 4. Orifices 4 are substantially circular. The row of orifices 4 is circular. Orifices 4 are arranged substantially in the middle of the span of heave plate 3. In FIG. 3a, orifices 4 are more spaced further out than in FIG. 3b. Thus, the porosity of heave plate 3 is greater for the variant of FIG. 3b in relation to the variant of FIG. 3a.

Figure 4:
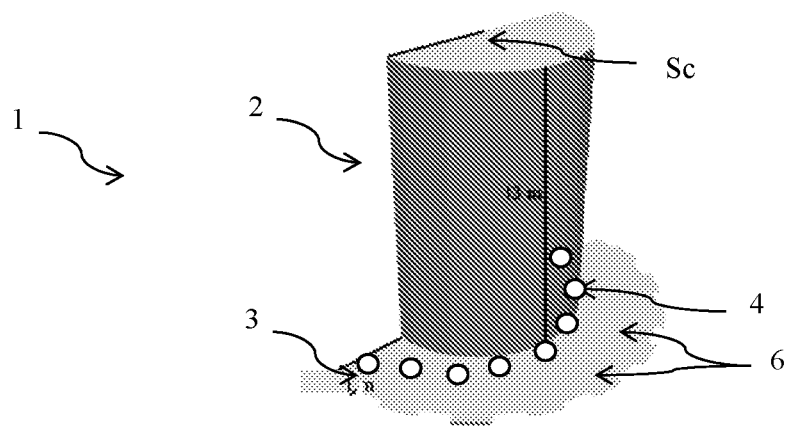
FIG. 4 illustrates a floating support structure according to a third embodiment of the invention.

FIG. 4 schematically illustrates, by way of non limitative example, a floating support structure according to a third embodiment. FIG. 4 is a three-dimensional view of half a floating support structure. Floating support 1 comprises a substantially cylindrical main floater 2 of horizontal section Sc. Floating support 1 also comprises a heave plate 3 fastened to the base of main floater 2. In this figure, the thickness of the heave plate is not shown. The surface area of the horizontal section of heave plate 3 is greater than the surface area of the horizontal section of the main floater. Heave plate 3 is substantially cylindrical (not shown). The heave plate comprises a row of orifices 4. Orifices 4 are substantially circular. Orifices 4 are arranged substantially in the middle of the span of heave plate 3. Moreover, heave plate 3 comprises a plurality of notches 6 provided at the periphery of heave plate 3. Notches 6 are evenly distributed on this periphery. The notches substantially have a rectangular shape. Heave plate 3 can comprise between 5 and 30 notches 6.

The invention is not limited to the embodiments illustrated above so that other designs can also be considered. For example, the embodiment of FIG. 2 can be combined with the embodiment of FIG. 4. According to another design, for all the embodiments illustrated, the main floater and the heave plate can have a rectangular, square or hexagonal shape, etc. According to other features, the heave plates of the embodiments illustrated can have truncated cone shapes.

The present invention also relates to a wind turbine installation on a body of water such as the sea for example. The installation comprises a vertical-axis or horizontal-axis wind turbine and a floating support structure according to any one of the variant combinations described above. For example, a horizontal-axis wind turbine is made up of blades, of the rotor, the nacelle and the tower fastened to the floating support structure. The floating support can be anchored to the seabed by taut, semi-taut or catenary anchor lines. The goal of the floating support structure is to provide wind turbine buoyancy and stability to absorb the stresses exerted thereon and to counterbalance the thrust caused by the wind force while limiting motion of the assembly.

The invention claimed is:

1. A floating support structure comprising:
   at least one main floater and at least one heave plate with surface area in a horizontal section of each heave plate being greater than a surface area of a horizontal section of each one main floater, each heave plate being fastened to one of the at least one main floater, and each heave plate comprising orifices; and wherein
   the orifices are evenly distributed in a row with the row being parallel to an outer periphery of each heave plate and the horizontal section of each heave plate varies with depth and a periphery of each heave plate varies in thickness and has a reduced thickness at the periphery relative to a thickness of a remainder of the heave plate which favors hydrodynamic damping of the floater.

2. A support structure as claimed in claim 1, wherein the orifices are one of being circular, trapezoidal or rectangular.

3. A support structure as claimed in claim 1, wherein porosity of the heave plate in a region of the row of orifices ranges between 0.1 and 10%.

4. A support structure as claimed in claim 2, wherein porosity of the heave plate in a region of the row of orifices ranges between 0.1 and 10%.

5. A support structure as claimed in claim 1, wherein the heave plate comprises at least one of notches and projections which are evenly distributed over an outer periphery thereof.

6. A support structure as claimed in claim 2, wherein the heave plate comprises at least one of notches and projections which are evenly distributed over an outer periphery thereof.

7. A support structure as claimed in claim 3, wherein the at least one heave plate comprises at least one of notches and projections which are evenly distributed over an outer periphery thereof.

8. A support structure as claimed in claim 4, wherein the at least one heave plate comprises at least one of notches and projections which are evenly distributed over an outer periphery thereof.

9. A support structure as claimed in claim 5, wherein the at least one of the notches and the projections are rectangular.

10. A support structure as claimed in claim 6, wherein the at least one of the notches and the projections are rectangular.

11. A support structure as claimed in claim 7, wherein the at least one of the notches and the projections are rectangular.

12. A support structure as claimed in claim 8, wherein the at least one of the notches and the projections are rectangular.

13. A support structure as claimed in claim 1, wherein the at least one heave plate is fastened to a base of the main floater.

14. A support structure as claimed in claim 2, wherein the at least one heave plate is fastened to a base of the main floater.

15. A support structure as claimed in claim 3, wherein the at least one heave plate is fastened to a base of the main floater.

16. A support structure as claimed in claim 5, wherein the at least one heave plate is fastened to a base of the main floater.

17. A support structure as claimed in claim 9, wherein the at least one heave plate is fastened to a base of the main floater.

18. A support structure as claimed in claim 1, wherein the at least one heave plate comprises at least one stiffener, the at least one stiffener being positioned from a center to an outer periphery of the at least one heave plate.

19. A support structure as claimed in claim 2, wherein the at least one heave plate comprises at least one stiffener, the at least one stiffener being positioned from a center to an outer periphery of the at least one heave plate.

20. A support structure as claimed in claim 3, wherein the at least one heave plate comprises at least one stiffener, the at least one stiffener being positioned from a center to an outer periphery of the at least one heave plate.

21. A support structure as claimed in claim 5, wherein the at least one heave plate comprises at least one stiffener, the at least one stiffener being positioned from a center to an outer periphery of the at least one heave plate.

22. A support structure as claimed in claim 9, wherein the at least one heave plate comprises at least one stiffener, the at least one stiffener being positioned from a center to an outer periphery of the at least one heave plate.

23. A support structure as claimed in claim 1, wherein the at least one heave plate is steel or concrete.

24. A support structure as claimed in claim 1, wherein the at least one heave plate comprises one of a circular section, hexagonal section, or a square horizontal section.

25. An offshore wind turbine comprising a wind turbine and floating support structure as claimed in claim 1.

* * * * *